(12) United States Patent
Herbst et al.

(10) Patent No.: US 8,749,909 B1
(45) Date of Patent: Jun. 10, 2014

(54) DISK DRIVE WITH SERVO SYSTEM WITH TIMING ADJUSTMENTS TO MASTER TIMER FOR SAM DETECTION ERRORS

(71) Applicant: HGST Netherlands B.V., Amsterdam (NL)

(72) Inventors: Gary Allan Herbst, San Jose, CA (US); Kirk Hwang, Palo Alto, CA (US); Masaki Kohno, San Jose, CA (US); Naoyuki Minami, Sagamihara (JP); Hung Phan, San Jose, CA (US)

(73) Assignee: HGST Netherlands B.V., Amsterdam (NL)

( * ) Notice: Subject to any disclaimer, the term of this patent is extended or adjusted under 35 U.S.C. 154(b) by 0 days.

(21) Appl. No.: 13/726,168

(22) Filed: Dec. 23, 2012

(51) Int. Cl.
*G11B 5/09* (2006.01)

(52) U.S. Cl.
USPC .............. 360/51; 360/48; 360/53; 360/55; 360/77.08

(58) Field of Classification Search
None
See application file for complete search history.

(56) References Cited

U.S. PATENT DOCUMENTS

| | | | |
|---|---|---|---|
| 5,345,347 A | 9/1994 | Hopkins et al. | |
| 5,402,200 A | 3/1995 | Shrinkle et al. | |
| 5,521,768 A | 5/1996 | Shrinkle et al. | |
| 6,021,012 A | 2/2000 | Bang | |
| 6,115,199 A * | 9/2000 | Bang | 360/51 |
| 7,075,742 B2 | 7/2006 | Ehrlich | |
| 7,092,177 B2 | 8/2006 | Ehrlich | |
| 7,739,533 B2 | 6/2010 | Rauschmayer et al. | |
| 7,817,365 B2 | 10/2010 | Fisher | |
| 7,929,237 B2 | 4/2011 | Grundvig et al. | |
| 8,189,285 B1 | 5/2012 | Spaur et al. | |

* cited by examiner

*Primary Examiner* — Muhammad N Edun
(74) *Attorney, Agent, or Firm* — G. Marlin Knight

(57) ABSTRACT

A disk drive is described with a single servo master timer that is used to control timing critical signals such as servo gate, SAM windows, channel power save, PREAMP power save and so on. The master timer is adjusted to compensate for SAM detection errors (early, late or missed) and provides improved servo timing quality. In an embodiment the adjustable master timer can be selectably clocked by either the DLC/DSW clock or the system clock.

18 Claims, 8 Drawing Sheets

DISK DRIVE WITH SERVO SYSTEM WITH TIMING ADJUSTMENTS TO MASTER TIMER FOR SAM DETECTION ERRORS

FIELD OF THE INVENTION

The invention relates to servo control systems used in disk drives and particularly to techniques for making timing adjustments in such systems when servo address marks (SAMs) are not detected in the allowable window.

BACKGROUND

The precise positioning of the read and write heads over tracks on rotating disks is achieved by a servo system in disk drive using servo patterns that are prerecorded in magnetic material on the disks as part of the manufacturing process. Typically servo patterns are written at regular angular intervals and form wedge-shaped areas extending from the inner diameter (ID) to the outer diameter (OD) that define the sectors in the concentric tracks. The servo fields for each sector typically include a servo address mark (SAM), which is a unique pattern in the servo area that is used to synchronize processing of the subsequent servo fields.

SAM detection window is the allowable time window within which the read channel attempts to locate the SAM. To avoid misdetection, it is better to have a shorter time window and have the beginning and end of the window be very precise. In U.S. Pat. No. 6,021,012 to H. Bang (Feb. 1, 2000) an automatic servo address mark detection and servo timing compensating circuit is described that includes a count control signal where the servo address mark is not detected within a range of a servo address mark window.

A variety of clock signals are used in a disk drive and are affected by power management modes. U.S. Pat. No. 7,739,533 to Rauschmayer, et al. (Jun. 15, 2010) describes an operational power management system for a disk drive that includes two or more clock sources and a power management controller.

In U.S. Pat. No. 8,189,285 to Spaur, et al. (May 29, 2012) automatic time base adjustment for disk drive servo controllers is described. A servo timer is adjusted between the consecutive servo fields based on the skew value that occurs when the system switches from reading with one head to reading with another head (a head change).

Typically the system clock is based on oscillating crystal and PLL electronics and requires relatively low power. The system clock runs at both startup of disk drive and also during power-saving sleep mode of hard drive. The system clock operates independently from the rate that signals to and from the rotating disk are actually written and read. Because the system clock does not vary with disk speed, it is less useful for detection of SAMs. The disk lock clock (DLC) or disk synchronous write clock (DSW) is a clock signal that is synchronized to signals generated as servo address marks (SAMs) pass under the read head during operation. The DSW is more useful to identify mis-detections (early or late) and missing SAMs but requires more electronics being active and accordingly more power usage. The SAM signal from the read head must be processed by the read channel portion of the system electronics and, therefore, the DSW is not available when read channel and/or read-head current is shut down in power-saving modes. Various systems and methods for power management are disclosed in the prior art including a sleep mode in which the read channel is turned off independently from other parts of the system. Thus, servo system operation in power-saving modes becomes a challenge.

In the prior art it is difficult to control servo gate, SAM window, channel power save mode, and arm electronics preamp power save mode precisely without long term jitter and errors.

SUMMARY OF THE INVENTION

Embodiments of the invention use a single servo master timer that is used to control timing critical signals such as servo gate, SAM windows, channel power save, PREAMP power save and so on. The master timer is adjusted to compensate for SAM detection errors (early, late or missed) and provides improved servo timing quality. In an embodiment the adjustable master timer can be selectably clocked by either the DLC/DSW clock or the system clock.

In an embodiment of the invention in normal operation the master timer measures the SAM-SAM interval. Upon detection of the SAM or timing out of the SAM search window the timer value is saved in a memory location such as a register and the master timer is reset. The SAM search window is slightly larger than the standard allowable SAM window and includes early and late detection regions which trigger timing adjustment.

The measured SAM-SAM interval is compared to the predetermined ideal value to calculate the amount of error which can be zero for measured values that fall within an acceptable range. Too low of a measured value indicates that the SAM was early and the master timer value is accordingly adjusted downward. Too high of a measured value indicates that the SAM was late and the master timer value is accordingly adjusted upward. A missing SAM is treated similarly as a late SAM for timer adjustment. The master timer adjustments occur before the end of the servo gate.

Embodiments of the invention adjust the master timer when required by reading the current value and then adding or subtracting a calculated value to get an updated timer value. The updated timer value is then loaded into the master timer. An initial timer value register can be used both as the master timer starting value in the next SAM cycle and to load the updated timer value in mid-cycle.

By selecting DLC/DSW clock the amount of allowable error such as PLL jitter from system clock and servo sector interval variation due to disk slip in normal operation is reduced. The system clock is used to allow channel to be in deep sleep mode where DLC/DSW clock has been turned off.

Embodiments of the invention allow power management by using a single precise master timer for SAM detection that uses clock sources selected by the timer controls. The master timer can be used to implement channel power save mode and PREAMP power save mode in mid-cycle. In an embodiment selectable clock sources include DLC/DSW clock, which is precise but requires more power, and the system clock, which is less precise but requires less power, and is, therefore, used in power saving modes. An object of the invention is to enable choice of clocks for power saving tradeoff. The DLC/DSW clock requires read channel operation, but the read channel is shut down during power saving modes. Although the DLC/DSW clock is more precise, the system clock is sufficient for early start up actions and sleep mode actions.

DETAILED DESCRIPTION OF THE INVENTION

This invention improves servo timing control accuracy. Improved SAM detection results from master timer value correction for multiple error conditions such as missing SAM, early SAM, late SAM, and false SAM detection (mis-detected SAM). Power saving mode control is also improved by accurate timing control of channel and preamp power saving modes. Power saving is also facilitated by allowing selectable DLC/DSW and system clock sources. Embodiments of the invention control these signals precisely by basing all of them on the single master timer. Based on SAM detection found error conditions as early SAM, late SAM, no SAM, or mis-detected SAM, the appropriate timing adjustment is made. The determination differentiates between missing and mis-detected SAMs.

SAM (servo address mark) detection is key for servo timing quality. The invention measures actual SAM-SAM interval when consecutive SAMs are detected. The actual SAM-SAM interval is compare to the ideal servo SAM-SAM interval. The ideal servo SAM-SAM interval is a predetermined value that will be specified for a particular disk drive product. When the amount of error is outside of the allowable range, timer correction is performed based on the amount of error from the ideal point. If the correction for missing, late, early, and mis-detected SAM is necessary, the adjustment value is determined and applied to the master timer.

The invention reduces the amount of error such as PLL jitter from when using the system clock and servo sector interval variation due to disk slip in normal operation by selecting DLC/DSW clock. Using system clock allows the channel to be in deep sleep mode where DLC/DSW clock has been turned off.

There are ways to save power even while the drive is active. For example, when the drive is active but not currently writing or reading user data, it is possible to turn off some of the electronics in the brief window between the servo sector IDs (SIDs). Embodiments of the master timer can provide very precise signals based on the DLC/DSW clock to shutdown and wake up the electronics such as the read channel and preamp in between servo sectors. The wake up time must meet the minimum requirements of the electronics, either channel or preamp.

Additional power savings can be achieved in sleep modes. When a drive is idle for several minutes, some systems can be put into a deep sleep mode in which servo information can be ignored for many revolutions of the disk. In this sleep mode the DLC/DSW clock from the channel is not available, so the master timer can be programmed to use the system clock to run the timer. The master timer can then be used to create an interrupt to wake up the electronics, reacquire servo information and be ready for the next operation or go back into deep power save.

Figure 7:
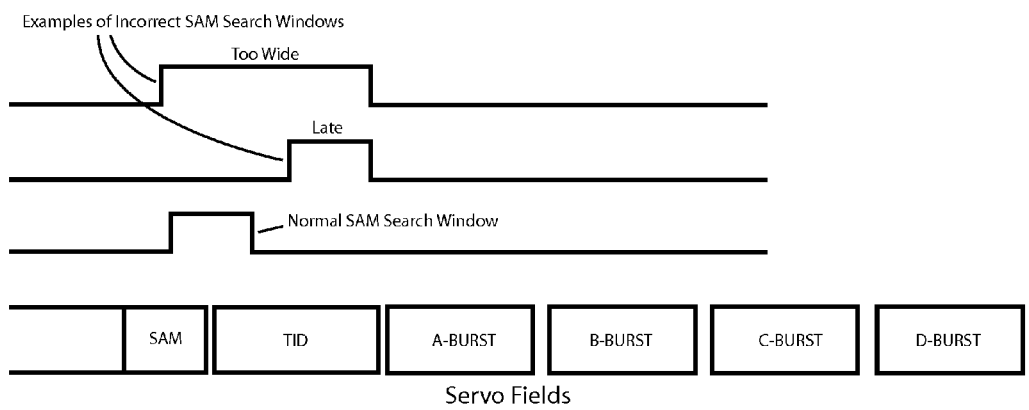
FIG. 7 is a signal timing diagram illustrating possible SAM search window errors.

FIG. 7 is a signal timing diagram illustrating a normal SAM search window and two possible search window errors. From track to track or head to head in a disk drive, there are timing gaps which are the main cause of early or late SAM detection. The SAM pattern is limited length to avoid increased overhead, which means there is a chance the system will erroneously detect (mis-detect) a SAM in a wrong location such as the track ID or even in the user data area. Setting a narrower SAM search window reduces the chance for mis-detection in a wrong location, but it increases chances of failing to find the correct SAM due to the timing jitter. Possible approached to these problems include expanding the SAM search window and adding logic to distinguish mis-detection from correct detection. The servo system can use the history of head positions to estimate the next position. If the SAM detection is late and the estimated track ID location is out of expected range, the system treats the detected SAM as a mis-detection. If the system does not distinguish the mis-detection from late detection, the expected SAM location will be wrongly updated and the system will keep trying to find SAM in wrong location, which causes servo unlock and forces the system in SAM search mode (which takes up system time). This invention prevents the performance loss and provides robust on-the-fly recovery. Reading and verifying the TID following a SAM detection is a way to verify that the SAM was correctly detected. As FIG. 7 illustrates, finding the SAM in correct location allows the TID to read correctly, while a misdetection (false) SAM will not be followed by a correct TID. The system can also include some checks on the TID using knowledge of what the expected TIDs on a particular track should contain.

Figure 1A:
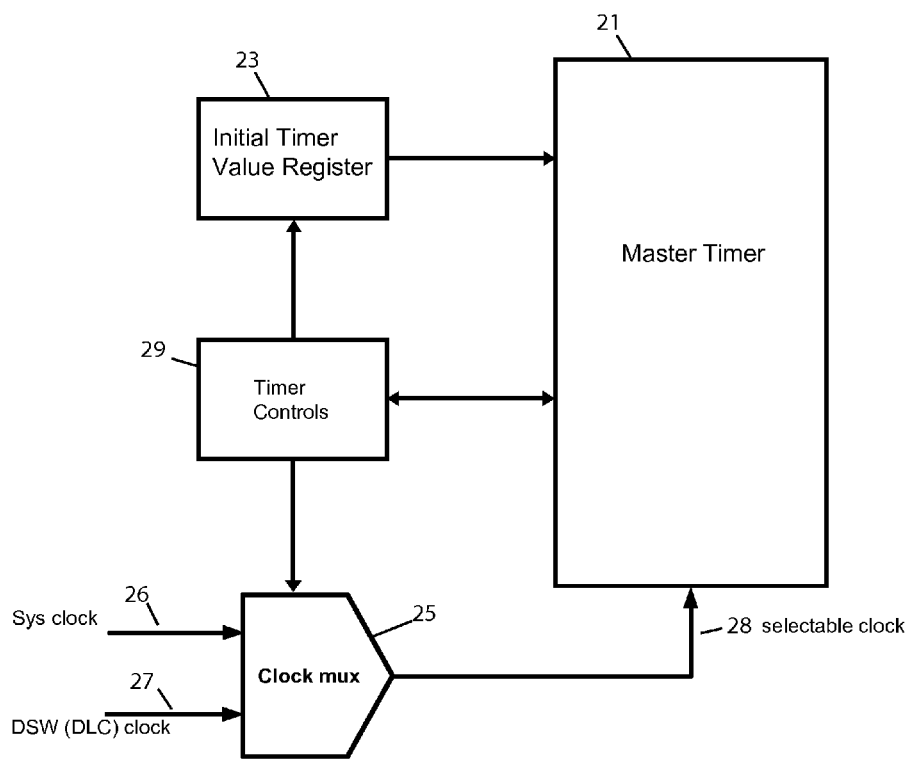
FIG. 1A is a block diagram illustration of a master timer system according to an embodiment the invention.

FIG. 1 is a block diagram illustration of a master timer control block according to an embodiment the invention. The master timer 21 is used to control timing critical signals such as servo gate, SAM windows, channel power save, PREAMP power save and so on. The master timer 21 should have a sufficient number of bits (e.g. 32-bits) to span the maximum timing interval. The master timer 21 starting counts up when reset from initial timer value register 23, which is writable by timer controls 29. The current value in the master timer can be read at any time by the timer controls 29. The master timer 21 can also be reloaded in mid-cycle to adjust the timer according to the invention. The adjustment value is calculated and the current value is read. The updated/adjusted value is loaded in the initial timer value register 23 and then the timer controls 29 direct the master timer 21 to reload using register 23 as the starting value. The adjusted value in the initial timer value register 23 remains in place until the next SID; after that, it will be reset to zero.

The clock signal 28 for the master timer 21 comes from clock multiplexor (mux) 25. In this embodiment the two clock inputs for the clock mux are the system clock 26 and DSW/DLC clock 27. The clock mux selects either system clock 26 or DSW/DLC clock 27 as input clock for the master timer 21. The clock mux is controlled by the disk drive as part of the overall power management process.

Figure 1B:
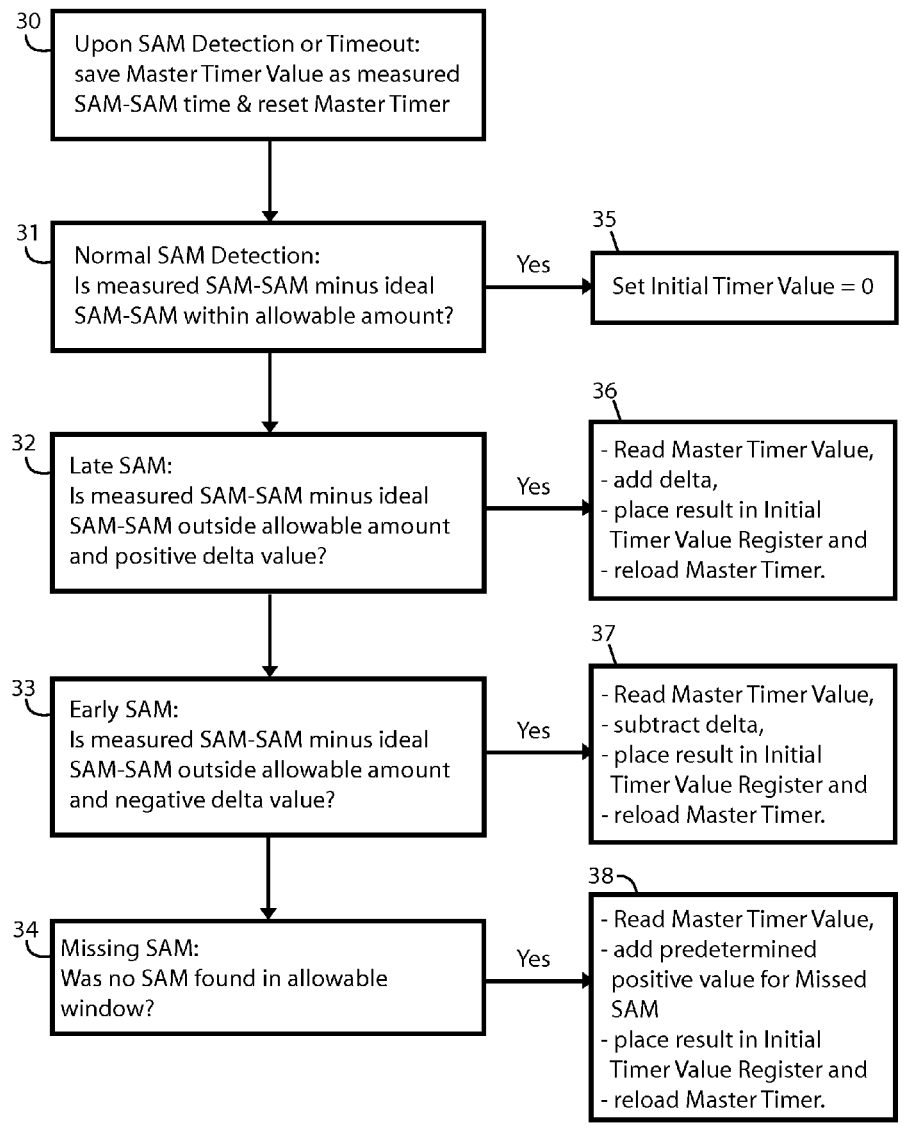
FIG. 1B is a flowchart illustrating the system's response to normal SAM detection and for misdetection cases for an embodiment the invention.

FIG. 1B is a flowchart illustrating the system's response to normal SAM detection and for misdetection cases for an embodiment the invention. In each case, whenever a SAM is detected or timeout occurs, the system saves the value in the master timer before resetting it 30. This value is the measured SAM-SAM time interval. In the normal case where a SAM is correctly detected within the allowable target window, the measured SAM-SAM time interval minus ideal SAM-SAM is within a predetermined allowable amount 31. In this case the initial timer value register 23 is set 0 and no adjustment to the master timer takes place 35.

The late SAM case occurs when the measured SAM-SAM time minus ideal SAM-SAM time is positive and larger than the predetermined allowable value 32. In this case the delta beyond the predetermined ideal value is used as the positive adjustment value. The adjustment process 36 reads the current master timer value, adds the adjustment value, places the result in the initial timer value register 23 and directs the master timer to reload from register 23. The result is that the master timer value is increased in mid-cycle.

The early SAM case occurs when the measured SAM-SAM time minus ideal SAM-SAM time is negative and beyond the predetermined allowable value 33. The delta beyond the predetermined ideal value is used as the adjustment value. The adjustment process 37 reads the current master timer value, subtracts the adjustment value, places the result in the initial timer value register 23 and directs the master timer to reload from register 23. The result is that the master timer value is decreased in mid-cycle.

The missing SAM case occurs when no SAM has been detected and timeout occurs for the SAM search window 34. The missing SAM case results in the positive adjustment value of the delta between the ideal SAM detection time and the master timer value when the search window timed out. The adjustment process 38 reads the current master timer value, adds the adjustment value, places the result in the initial timer value register 23 and directs the master timer to reload from register 23. The result is that the master timer value is increased in mid-cycle. At the end of the SAM search window, the system begins to calculate the timer adjustment values as described. In a practical embodiment it could take about 20-30 clock cycles after the SAM search window times out to calculate the timer adjustment and adjust the master timer content. This operation takes place before the servo gate signal ends.

Figure 2:
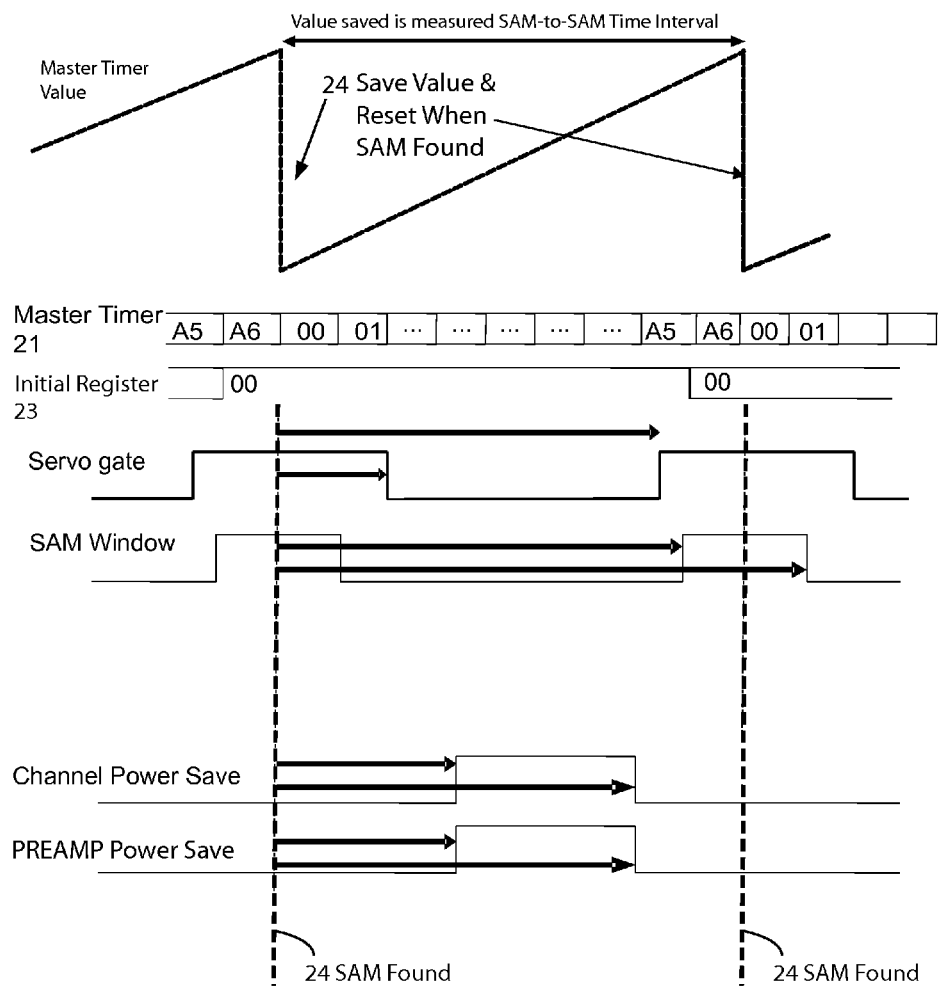
FIG. 2 is a signal timing diagram illustrating the interval timings for a normal SAM-SAM detection for an embodiment the invention showing a case where the channel power save signal and the PREAMP power save signal are activated.

The operation of the master timer control block will be described further using signal timing diagrams. FIG. 2 is a signal timing diagram illustrating the interval timings for a normal SAM-SAM detection for an embodiment the invention showing a case where the channel power save signal and the PREAMP power save signal are activated. The SAM search window occurs inside the servo gate window. In this case the SAMs detected 24 normally in the center region of the SAM search window. The master timer value at detection is shown arbitrarily as "A6." This value is saved as the measured SAM-SAM time and the master timer is reset 24. The initial timer value register 23 has been set to 0, so the master timer restarts from 0. The timing chart includes channel power save and PREAMP power save control signals to illustrate how these signals can be timed between the servo gate windows. These power saving modes are only allowable when the system is not reading or writing user data in the sector.

Figure 3:
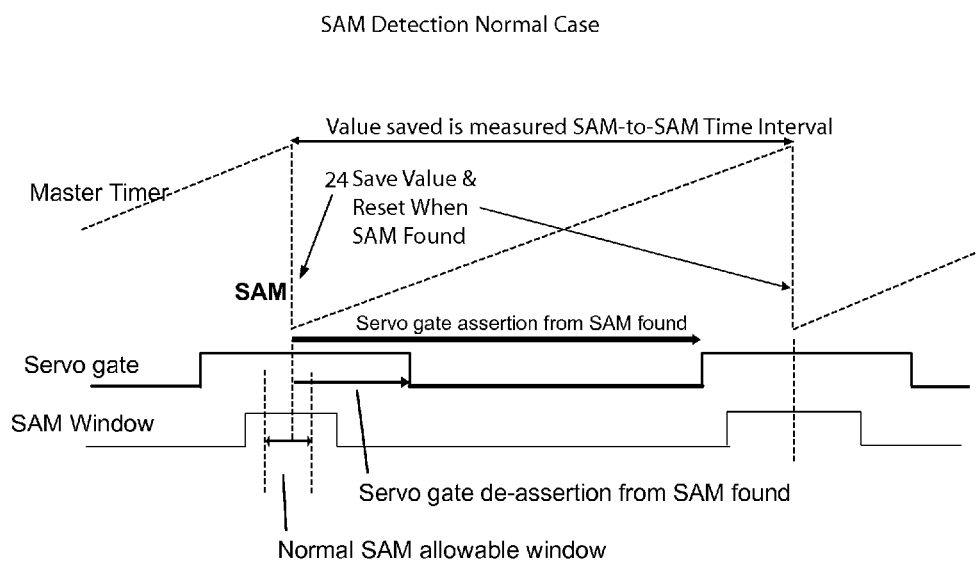
FIG. 3 is a signal timing diagram illustrating selected interval timings for a normal SAM detection for an embodiment the invention.

FIG. 3 is a signal timing diagram illustrating selected interval timings for a normal SAM detection for an embodiment the invention. This diagram illustrates the normally allowable SAM timing window which is positioned within the longer SAM search window. Two timing intervals are shown that use the master timer which is measuring the time from the SAM detection point when the last rest occurred. The first interval is for servo gate de-assertion. The second interval is the time for servo gate assertion for the next SID. The position of these operations in relation to SID fields on the track changes when the master timer is adjusted according to the invention as will be further described below.

Figure 4:
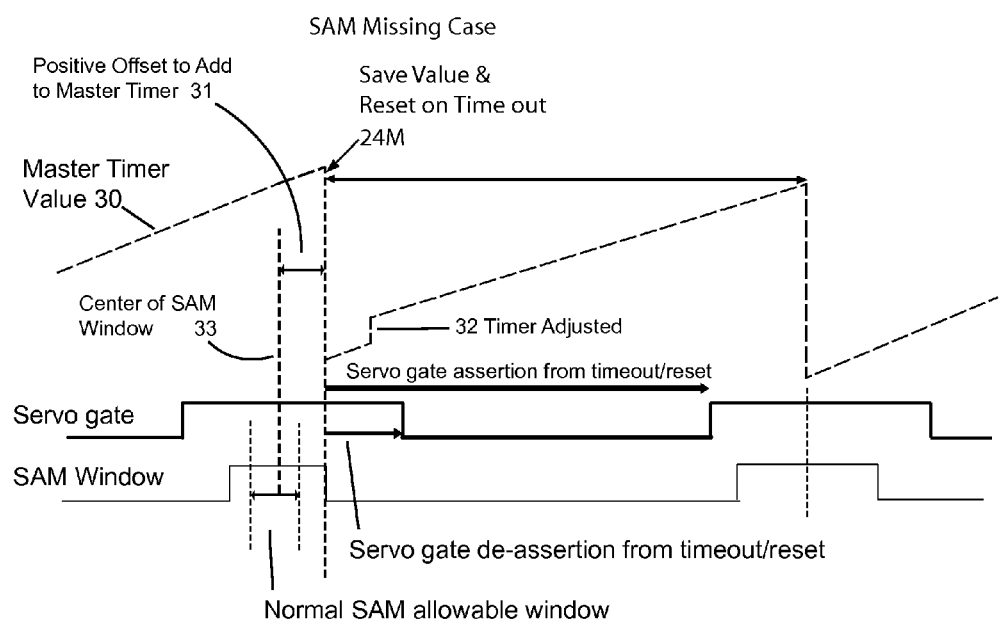
FIG. 4 is a signal timing diagram illustrating selected interval timings for an embodiment the invention for the case where a SAM has not been detected in the SAM search window, i.e. the SAM missing.

FIG. 4 is a signal timing diagram illustrating selected interval timings for an embodiment the invention for the case where a SAM has not been detected in the SAM search window, i.e. the SAM missing case. When a SAM is not detected in the SAM search window, a timeout occurs. The master timer is reset, but the content does not represent an actual measured SAM-SAM interval since the SAM was not detected. The timer adjustment value 31 is calculated as the difference between the master timer value at the center 33 of the standard SAM search window and the final master timer value when the reset occurs. The timer value for the center of the SAM search window 33 is a predetermined value that specified for the particular disk drive product. The timer adjustment value 31 is then added to the master timer contents at the point labeled as timer adjusted 32.

Figure 5:
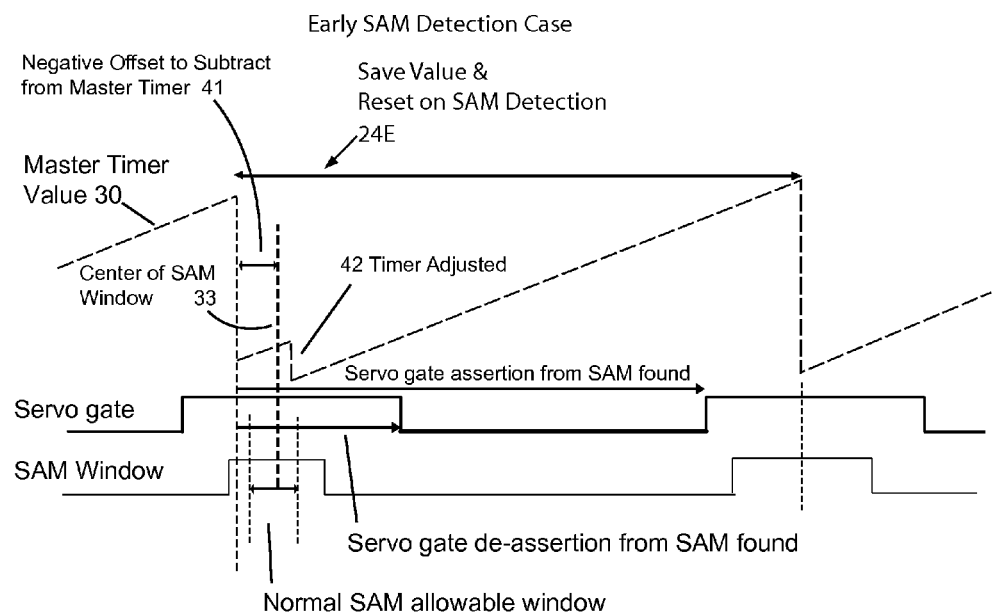
FIG. 5 is a signal timing diagram illustrating the interval timings for an embodiment the invention for the case where a SAM has been detected than earlier than is allowable, i.e. an early SAM detection case.

FIG. 5 is a signal timing diagram illustrating the interval timings for an embodiment of the invention for the case where a SAM has been detected earlier than is allowable, i.e. an early SAM detection case. In this case the SAM is detected slightly before the predefined allowable SAM window. The master timer is reset at this point 24E. The timer adjustment value 41 is calculated as the difference between the predetermined ideal master timer value at the center 33 of the SAM detection window and the master timer value when reset. The timer adjustment value 41 is then subtracted from the master timer contents at the point labeled as timer adjusted 42.

Figure 6:
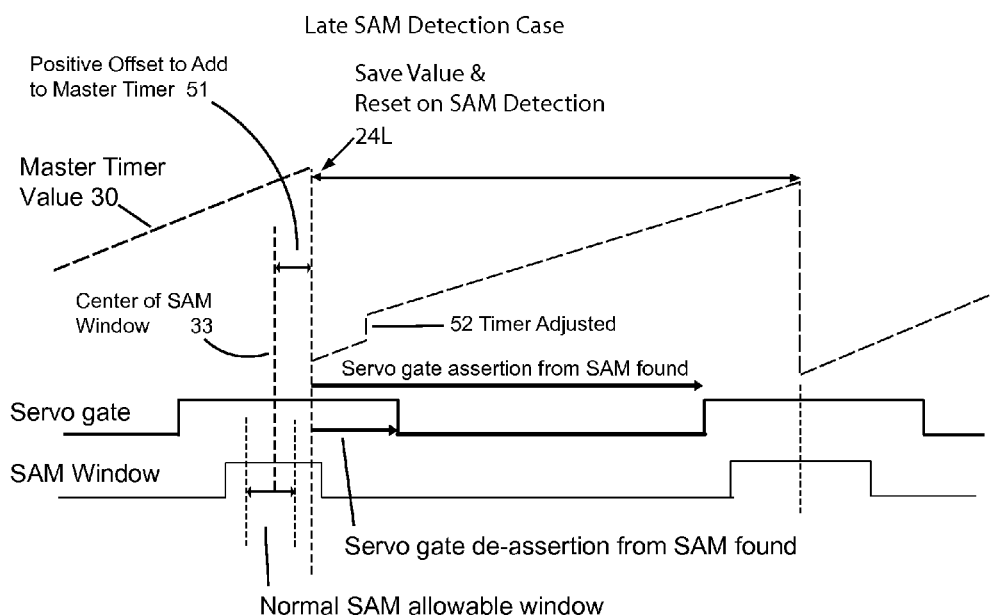
FIG. 6 is a signal timing diagram illustrating the interval timings for an embodiment the invention for the case where a SAM has been detected than later than is allowable, i.e. a late SAM detection case.

FIG. 6 is a signal timing diagram illustrating the interval timings for an embodiment of the invention for the case where a SAM has been detected later than is allowable, i.e. a late SAM detection case. In this case the SAM is detected slightly after the allowable SAM window. The master timer is reset at this point 24L. The timer adjustment value 51 is calculated as the difference between the master timer value when reset and the predetermined master timer value at the center 33 of the SAM detection window. The timer adjustment value 51 is then added to the master timer contents at the point labeled as timer adjusted 52.

The invention claimed is:

1. A method of operating a disk drive comprising:
timing a servo gate control signal and a servo address mark (SAM) search window from a master timer;
using the master timer to measure a SAM-SAM time interval between consecutive SAM detections by saving a current master timer value and resetting the master timer when a SAM is detected; and
adjusting the current master timer value when SAM detection fails to occur in a selected normal region of the SAM search window by changing the current master timer value to adjust for early, late or missing SAM detection by adding an adjustment amount to the current master timer value or subtracting the adjustment amount from the current master timer value.

2. The method of claim 1 wherein resetting the master timer causes the master timer to load an initial value from a writable initial value register and the method further comprises setting the initial value register to zero when a SAM is detected in the normal region; and wherein changing the current master timer value further comprises reading the current master timer value, adding or subtracting the adjustment amount from the current master timer value to obtain an adjusted result, placing the adjusted result in the initial value register and causing the master timer to load the adjusted result from the initial value register.

3. The method of claim 1 wherein adjusting the current master timer value for a missing SAM detection further comprises adding a selected positive value to the current master timer value.

4. The method of claim 1 wherein the master timer is selectably clocked by either a first or a second clock source for a master timer in a servo system.

5. The method of claim 4 wherein the first clock source is a disk synchronous write clock and the second clock source is a system clock.

6. A method of operating a disk drive comprising:
timing a servo gate control signal and a servo address mark (SAM) search window from a master timer;
using the master timer to measure a SAM-SAM time interval between consecutive SAM detections by saving a current master timer value and resetting the master timer when a SAM is detected; and
adjusting the current master timer value when SAM detection fails to occur in a selected normal region of the SAM search window by changing the current master timer value to adjust for early, late or missing SAM detection;
wherein adjusting the current master timer value for a late SAM detection further comprises determining a positive time delta between an ideal SAM detection point and the master timer value when the late SAM was detected and adding the positive time delta to the current master timer value.

7. A method of operating a disk drive comprising:
timing a servo gate control signal and a servo address mark (SAM) search window from a master timer;
using the master timer to measure a SAM-SAM time interval between consecutive SAM detections by saving the current master timer value and resetting the master timer when a SAM is detected; and
adjusting the current master timer value when SAM detection fails to occur in a selected normal region of the SAM search window by changing the current master timer value to adjust for early, late or missing SAM detection;
wherein adjusting the current master timer value for an early SAM detection further comprises determining a positive time delta between the current master timer value when the early SAM was detected and an ideal SAM detection point and subtracting the positive time delta from the current master timer value.

8. A method of operating a disk drive comprising:
timing a servo gate control signal and a servo address mark (SAM) search window from a master timer;
using the master timer to measure a SAM-SAM time interval between consecutive SAM detections by saving the current master timer value and resetting the master timer when a SAM is detected; and
adjusting the current master timer value when SAM detection fails to occur in a selected normal region of the SAM search window by changing the current master timer value to adjust for early, late or missing SAM detection;
wherein changing the current master timer value further comprises reading the current master timer value, adding to or subtracting an amount from the current master timer value to generate an adjusted value and reloading the adjusted value into the master timer.

9. A method of operating a disk drive comprising:
timing a servo gate control signal and a servo address mark (SAM) search window from a master timer;
using the master timer to measure a SAM-SAM time interval between consecutive SAM detections by saving the current master timer value and resetting the master timer when a SAM is detected; and
adjusting the current master timer value when SAM detection fails to occur in a selected normal region of the SAM search window by changing the current master timer value to adjust for early, late or missing SAM detection;
wherein a selected power saving mode is timed using the master timer and selected power saving mode is selectably entered between servo gate control signal assertions when user data is not being read or written.

10. A disk drive with a servo system comprising:
a master timer used for timing a servo gate control signal and a servo address mark (SAM) search window, the master timer being used to measure a SAM-SAM time interval between consecutive SAM detections by saving the current master timer value and resetting the master timer when a SAM is detected; and
timer controls that adjust the current master timer value when SAM detection fails to occur in a selected normal region of the SAM search window by changing the current master timer value to adjust for early, late or missing SAM detection by adding an adjustment amount to the current master timer value or subtracting the adjustment amount from the current master timer value.

11. The disk drive of claim 10 wherein the servo system includes a writable initial value register connected to the master timer and wherein resetting the master timer causes the master timer to load an initial value from the writable initial value register and wherein the timer controls set the initial value register to zero when a SAM is detected in the normal region; and wherein the timer controls adjust the current master timer value by placing an adjusted timer value in the initial value register and resetting the master timer.

12. The disk drive of claim 10 wherein the timer controls adjust the current master timer value for a missing SAM detection by adding a selected positive adjustment amount to the current master timer value.

13. The disk drive of claim 10 further comprises a multiplexor that selectably clocks the master timer by either a first or a second clock source.

14. The disk drive of claim 13 wherein the first clock source is a disk synchronous write clock and the second clock source is a system clock.

15. A disk drive with a servo system comprising:
a master timer used for timing a servo gate control signal and a servo address mark (SAM) search window, the master timer being used to measure a SAM-SAM time interval between consecutive SAM detections by saving the current master timer value and resetting the master timer when a SAM is detected; and
timer controls that adjust the master timer when SAM detection fails to occur in a selected normal region of the SAM search window by changing the current master timer value to adjust for early, late or missing SAM detection;
wherein the timer controls adjust the master timer for a late SAM detection by determining a positive time delta between an ideal SAM detection point and the current master timer value when the late SAM was detected and adding the positive time delta to the current master timer value.

16. A disk drive with a servo system comprising:
a master timer used for timing a servo gate control signal and a servo address mark (SAM) search window, the master timer being used to measure a SAM-SAM time interval between consecutive SAM detections by saving the current master timer value and resetting the master timer when a SAM is detected; and timer controls that adjust the master timer when SAM detection fails to occur in a selected normal region of the SAM search window by changing the current master timer value to adjust for early, late or missing SAM detection;

wherein the timer controls adjust the master timer for an early SAM detection by determining a positive time delta between the current master timer value when the early SAM was detected and an ideal SAM detection point and subtracting the positive time delta from the current master timer value.

17. A disk drive of with a servo system comprising:

a master timer used for timing a servo gate control signal and a servo address mark (SAM) search window, the master timer being used to measure a SAM-SAM time interval between consecutive SAM detections by saving the current master timer value and resetting the master timer when a SAM is detected; and timer controls that adjust the master timer when SAM detection fails to occur in a selected normal region of the SAM search window by changing the current master timer value to adjust for early, late or missing SAM detection;

wherein changing the current the master timer value further comprises reading the current master timer value, adding an adjustment amount to the current master timer value or subtracting the amount from the current master timer value to generate an adjusted value and reloading the adjusted value into the master timer.

18. A disk drive with a servo system comprising:

a master timer used for timing a servo gate control signal and a servo address mark (SAM) search window, the master timer being used to measure a SAM-SAM time interval between consecutive SAM detections by saving the current master timer value and resetting the master timer when a SAM is detected; and timer controls that adjust the master timer when SAM detection fails to occur in a selected normal region of the SAM search window by changing the current master timer value to adjust for early, late or missing SAM detection;

wherein a selected power saving mode is timed using the master timer and selected power saving mode is selectably entered between servo gate control signal assertions when user data is not being read or written.

* * * * *